United States Patent [19]

Dudley

[11] 4,016,781
[45] Apr. 12, 1977

[54] DEVICE FOR GUMMING AND SHARPENING CIRCLE SAWS

[76] Inventor: Alex Dudley, 220 Edgewood Road, Lansing, Mich. 48910

[22] Filed: Aug. 4, 1975

[21] Appl. No.: 574,362

[52] U.S. Cl. .................................................. 76/40
[51] Int. Cl.² ..................................... B23D 63/14
[58] Field of Search ............... 51/99; 76/37, 40, 43

[56] References Cited

UNITED STATES PATENTS

| 800,852 | 10/1905 | Kapp | 76/40 |
|---|---|---|---|
| 2,130,965 | 9/1938 | Porter | 76/43 |
| 2,970,499 | 2/1961 | Pridemore | 76/43 |
| 3,304,810 | 2/1967 | English | 76/40 |
| 3,457,809 | 7/1969 | Bowerman | 76/40 |
| 3,481,224 | 12/1969 | Aijala | 76/40 |
| 3,815,446 | 6/1974 | Murphy | 76/43 |

Primary Examiner—Harold D. Whitehead
Assistant Examiner—Nicholas P. Godici

[57] ABSTRACT

A sharpening apparatus for circular saw blades including a bench holding a saw clamping arbor mounted on a saw holding table, and a rocker arm carrying a cutting disc. The rocker arm is freely balanced and the saw arbor is freely rotatable so that the cutting disc can be easily tilted to the saw and the blade can be easily indexed to the next cutting tooth.

3 Claims, 5 Drawing Figures

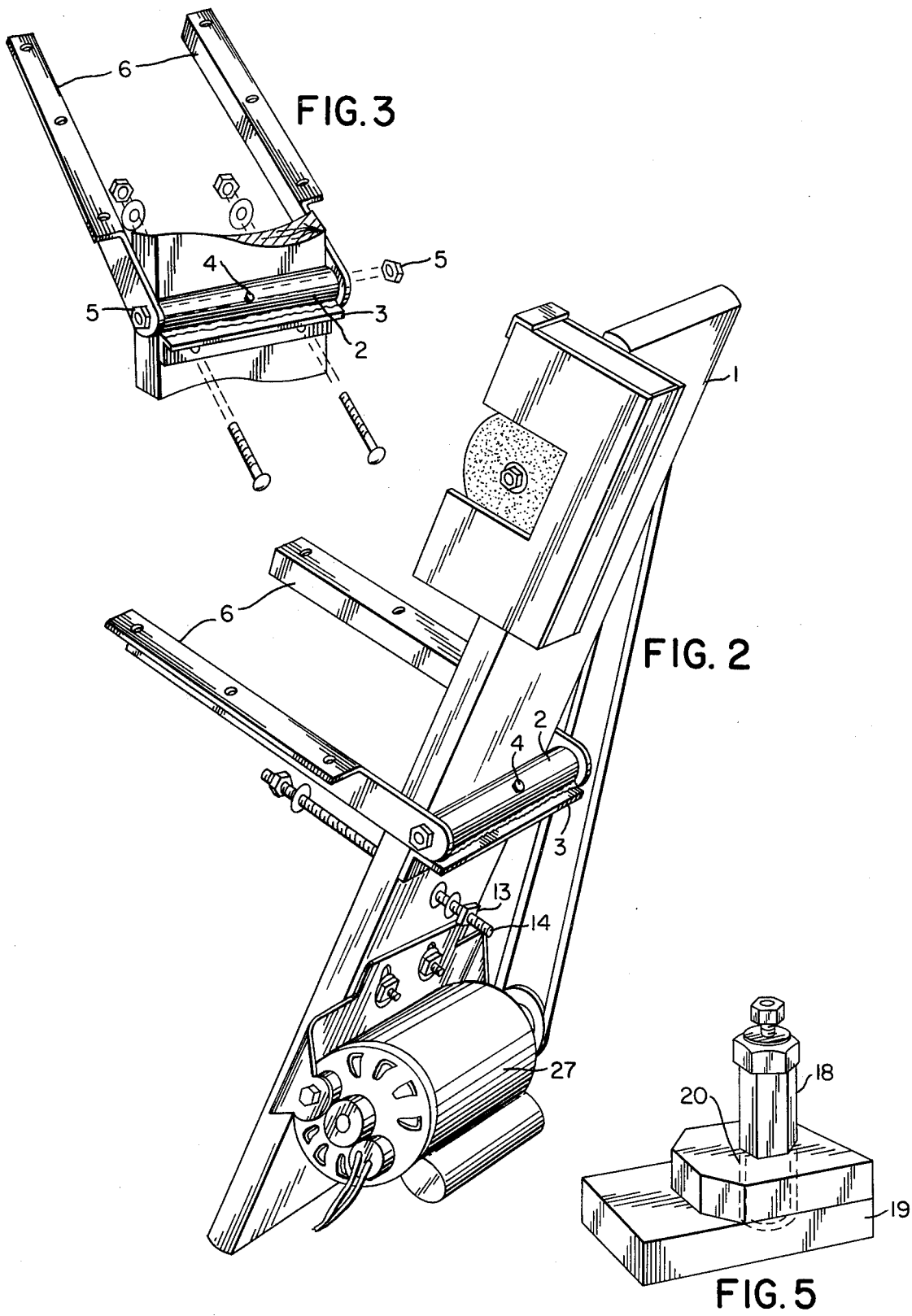

DEVICE FOR GUMMING AND SHARPENING CIRCLE SAWS

BACKGROUND

This invention relates to improvement in apparatus for sharpening circular saw blades and simplification of this process.

A sharpening apparatus is disclosed in U.S. Pat. No. 3,815,446 for sharpening circular saw blades, in which a carriage for a circular saw blade is mounted on a frame for movement to and from a grinding wheel carried by said frame. There are several drawbacks to known apparatus.

The known apparatus requires several adjustments both previous to and during the sharpening operation. It provides various locking positions in order to apply sharpener to saw teeth and provides for various angles for sharpening the up and down teeth, requiring the operator to rock the table from side to side with one hand while using his other hand to turn a stop rod during the sharpening process.

In the known process, sliding the saw blade into the cutting device is cumbersome, and the sharpening of up and down teeth is unnecessary and creates a needle point effect on saw teeth which is quickly broken down with use. It also requires turning the blade about it's axis two or three times to complete sharpening.

Accordingly, it is the object of this invention to provide a simplified and improved apparatus for sharpening circle saw blades. It is also the object to provide one which is portable, requires the minimum of adjustments, and very little operator skill. It is also the object to provide an apparatus which sharpens efficiently in a minimum of time, thus providing a more profitable climate for saw sharpening.

BRIEF DESCRIPTION OF THE DRAWINGS

FIG. 2 is a back view of the panel, showing the arrangement of the two housings, also the stop controlling the advance of panel toward blade, which is between rocker arm and motor.

FIG. 3 is a view of the rocker arm assembly on which panel is balanced.

FIG. 5 is a view of the sliding table and saw holding arbor.

DESCRIPTION OF THE PREFERRED APPARATUS

Figure 1:
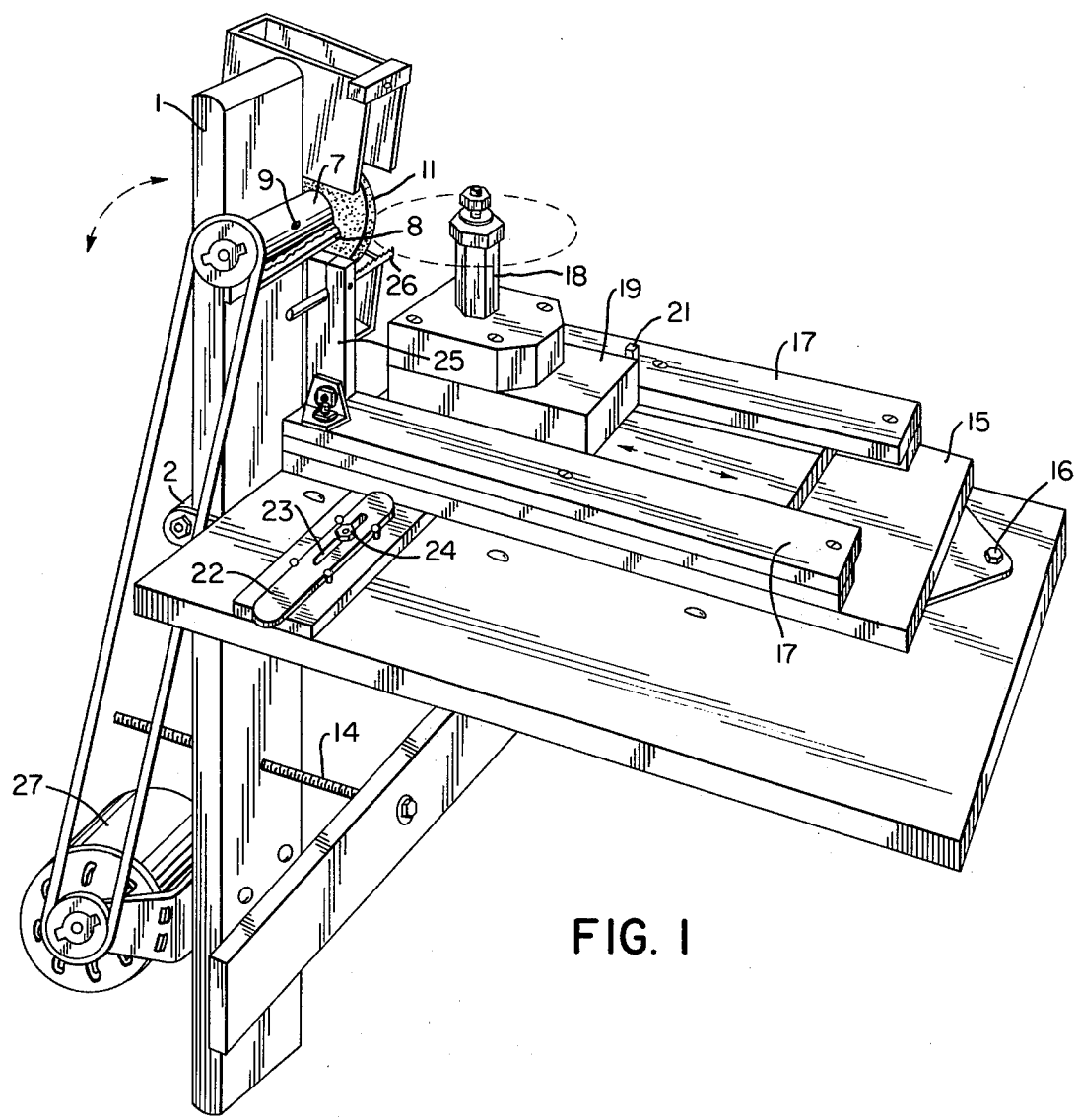
FIG. 1 is an overall view of my apparatus, showing a vertical rocker panel, carrying a motor at bottom, the belt and pulley which powers the housing at top of panel which carries the cutting disc, and in the center of panel the rocker arm on which it balances and by which it is attached to bench. Panel is shown in relation to longitudinal table on which saw blade is horizontally disposed.

Referring to FIG. 1, the vertical rocker panel 1 is a wooden panel 2 × 6 × 34 inches, balancing freely on a rocker arm 2, which arm is more fully shown in FIG. 3. Arm 2 is a bearing housing in which is journaled a rotating shaft, oil charged for lubrication, and provided with a bronze bushing at each end. These ends govern alignment to and fro as panel 1 is manually activated. Housing 2 is welded to angle iron 3 and bolted in a horizontal position athwart the vertical panel 1 exactly equidistant from each end of panel. Shaft 2 is provided with two threaded nuts at each end 5 shown in FIG. 3; one to adjust side play and one to secure shaft 2 to angle iron arms 6, which arms are releasably locked to bench.

Figure 4:
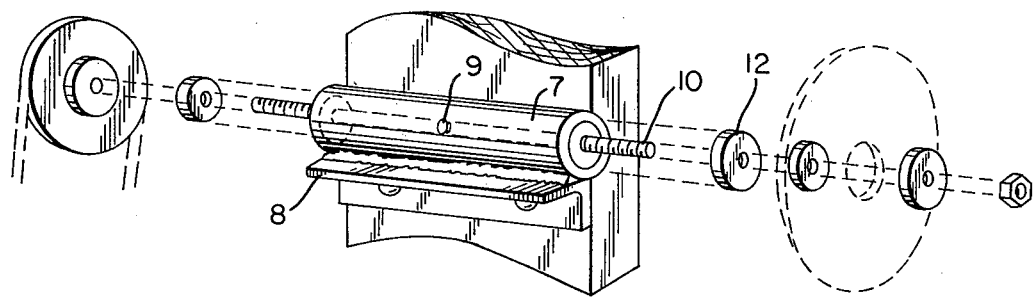
FIG. 4 shows the assembly which carries the cutting disc.

About 6 inches from top of panel 1, and more clearly shown in FIG. 4, is a bearing housing 7, in which a rotatable drive shaft is journaled, which housing 7 is welded to angle iron 8 and bolted to upper end of vertical panel 1 in a horizontal position, and secured with two bolts. Housing 7 has dustproof ball bearing in each end and is provided with means of lubrication 9. The end of shaft 10 receiving the cutting disc 11 has three flanges 12; one fixed flange and two portable ones, and a nut to secure the disc 11. The pulley end of shaft 7 has an adjusting nut for end play.

Referring again to FIG. 1, cutting disc 11 is held in a vertical plane parallel to the length direction of the base saw holding table 15 and contiguous to horizontally disposed saw blade.

FIG. 2 is a back view of the rocker panel arm 2, the motor 27 and housing for shaft carrying cutting disc 11. The motor is of variable speed and is mounted horizontally 12 inches below the centerline of rocker arm 2. This arrangement provides the proper weight for balance of the panel 1, allowing it to swing freely, and also provides power for the belt-driven 7 or 8 inches saucer shaped cutting disc 11. Rocker panel 1 is also provided with a stop 14 which is anchored between the bench and panel 1, and located just above the motor 27. This stop 14 is a cylindrical rod with spiral grooves and it is fitted with an adjustable screw nut 13, which is manipulated back and forth as required to control the travel of panel 1 as it carries the cutting disc 11 to the root diameter of each saw tooth.

Again referring to FIG. 1, the sliding table 19, base or swing table 15, and arbor 18 on which the blade rests are in close relation to panel 1 and cutting disc 11. The base or swing table 15 is secured to bench by simply dropping the far end of table 15 over a metal pin 16, permitting the table 15 to be freely adjusted from side to side as required for the proper hook angle of any particular saw blade. Base table 15 is provided with ways 17 through which the conventional saw holding arbor 18 is allowed to travel between cutting disc 11 and swing pin 16.

Again in FIG. 1, the sliding table 19, which carries the saw holding arbor 18, consists of a block 19, which is bored out to receive a bronze bushing 20 on which the floating saw holding arbor 18 rests. The base of sliding table 19 projecting underneath the ways 17 of base table 15, is fitted with metal strips, causing the sliding table to move easily back and forth and said sliding base is provided with a stop, a thumb screw 21 which screws down against the metal strip, securing sliding table from further longitudinal movement at any point required.

An index stop 25, is also shown in FIG. 1, which stop is fixed by angle iron and lock screws to the ways 17 at a point near the center of the vertical panel 1 and just under the housing which carries the cutting disc 11. Stop consists of a ¾ × 1 × 6 inches riser block 25 which has a metal flexing blade stop 26 fixed to a ½ inch rod, which adjusts to and fro to an adjacent tooth, and when locked in position by draw bolt each tooth is stopped at proper hook as required.

As those familiar with the art know, when a saw blade is out of form, either from use or improper sharpening, it is impossible to index accurately from an adjacent tooth. Also, a fixed index stop required a fixed saw holding arbor and fixed index plate. In my device, I feel the free floating arbor has many advantages over a fixed arbor. In a visual, manual operation such as mine, it is possible to restore the original efficiency of the saw blade without the use of a fixed index, and to sharpen the teeth without burning the face of the tooth, which burning destroys the carbon content of saw and temper of tooth.

Proceeding with FIG. 1, a position holder 22 is provided to secure swing table 15 against further lateral movement after obtaining the proper hook angle of the tooth of the blade to be sharpened. This holder 22 consists of an elongated slot 23 with thumb screw lock 24, or hex nut, in center of said slot, which prevents any further lateral movement of the base table 15 after locking in position at the positive angle required for blade.

In using my apparatus, the blade to be sharpened is mounted on the floating arbor 18 in a horizontal position and secured with a lock nut. The blade supporting table holding arbor 18 is slid longitudinally upon it's base until teeth of saw blade are brought in close proximity to the vertically mounted disc 11, and table 19 is secured from further movement by locking thumb screw 21 on the ways 17 of base table 15.

The vertical rocker panel 1 is brought forward to exactly align with cutting face of tooth and advanced to root diameter of tooth, at which point the adjustable screw nut 13 on stop 14 on panel 1, is turned to secure the panel against further advance of the panel carrying cutting disc 11 into the gullet of the tooth.

After the root diameter of tooth is established, and the sliding table 19 secured by thumb screw 21, and the hex nut or thumb screw 24 on position holder 22 is secured in the elongated slot 23 against any further lateral movement of the swing or base table 15, the operator is ready to proceed with sharpening the blade. These are the only three steps required to set up for sharpening a saw on my apparatus. There are of course various bushings provided for different blade apertures.

To proceed, as the operator turns the blade manually with the left hand, the right hand grasps the top of the free swinging panel 1, and since the panel and the saw blade are in close proximity only a light touch is required to advance the cutting disc 11 to the depth of the gullet. As each tooth is brought around manually the simultaneously advancing cutting disc 11 reaches the gullet of the tooth, removing the debris from the trailing tooth and sharpening the face of the following tooth, establishing the original form of each tooth, continuing in this manner until all teeth are sharpened. There is no resistance in either the panel 1 or the floating arbor 18, and this easy oscillating action eliminates the burning of the face of the tooth while sharpening.

After all teeth in sequence are gummed and face sharpened, the operator releases the position holder 19, swings the base table 15 slightly to the right, which moves saw from dead center to a slightly eccentric position, and again sets the position holder 22 by tightening the nut 24; operator then releases and re-adjusts the screw nut 13 on vertical panel 1 to limit the travel of cutting disc 11 to O.D. of saw. Each tooth is again presented, and as panel 1 is advanced the cutting disc 11 lightly touches each tooth, giving it the proper rake and relief.

It can be appreciated that in my apparatus I have elminated any removal of the saw blade, or any adjustment of set-up, during sharpening, or any removal of blade from saw holding arbor 18 until each tooth is properly gummed, face sharpened, and given the proper rake.

The sort of synchronized movement of the balanced vertical panel 1 to and from the floating saw holding arbor 18 as each tooth is presented eliminates the necessity for any complicated use of cams, gears, or weights, or any adjustments during the sharpening operation except obtaining the eccentric position giving the teeth the proper rake. The set-up for this method of sharpening is simple; the sharpening process is accomplished without removing the blade from the arbor or turning it over, yet it produces a blade that is precision sharp and restored to it's original usefulness.

The saw holding arbor is provided with several bushings for various sizes and types of blade apertures.

What is claimed is:

1. A circular saw blade sharpening apparatus comprising, in combination:
   a. a bench supporting a saw holding table,
   b. a vertical rocker panel,
   c. a rotatable drive shaft for carrying a cutting disc, means for supporting said shaft athwart an upper end of said vertical panel in a horizontal position in which the cutting disc is disposed in a vertical plane parallel to the length direction of said vertical panel,
   d. a motor of variable speed for powering said drive shaft carrying said cutting disc, said motor being bolted athwart said vertical panel back at it's lower end; this arrangement of said motor providing proper weight to balance said panel at about 10° from upright and allowing said panel to swing freely to and fro,
   e. means for stopping the swing of said vertical panel at any given point required, said means being a cylindrical spiral rod secured through said bench and said panel, said rod being fitted with a screw nut adjustable to hold said panel at the proper angle for engagement of said vertically disposed cutting disc with the horizontally disposed saw blade,
   f. a rotatable rocker arm, means for mounting said rocker arm athwart the back of said rocker panel at dead center, means for locking said rocker arm to a set of angle arms, and means for releasably locking said angle arms to said bench supporting a saw holding table.

2. A circular saw blade sharpening apparatus according to claim 1 in combination with
   g. a saw blade supporting structure comprising an elongated base table provided at a far end with means for securing said base table over a metal pin received by said bench, thus leaving said base table free to swing to any position required laterally for engagement of a saw tooth by said cutting disc, means for locking said base table against further lateral movement, said means being a nut releasably lockable in an elongated slot after the proper hook angle of a saw tooth in relation to said cutting disc and said base table is obtained,
   h. said elongated base table provided with ways allowing a block carrying saw holding arbor to travel to and from said panel carrying said cutting disc, said block extending under the edge of said ways; said ways provided with metal longitudinal strips permitting said block to be slid on said base table to any point desired; means for securing said slidable block from further longitudinal movement after adjusting said slidable block to said cutting disc, i. a manually operable saw tooth locating means comprising a riser block affixed to the end of said elongated table nearest the rotating shaft carrying said cutting disc and on a plane parallel to said saw blade, said riser block containing a metal flexing stop affixed to a rod, which flexing stop is in a position to engage an adjacent tooth, a means for locking said riser block in position, j. a block on said slidable table bored to receive a bushing on which a saw holding arbor freely rotates, means for locking a saw blade on said saw holding arbor.

3. A circular saw blade sharpening apparatus comprising, in combination, a vertical rocker panel with a rotatable drive shaft carrying a cutting disc; a motor for powering said drive shaft; a rocker arm on which said vertical panel is balanced; means for securing said panel against further progress toward saw holding structure, in cooperating means with, a. a saw blade supporting structure comprising an elongated base table, means for securing said table to a bench; ways allowing a block carrying a saw holding arbor to travel to and from said vertical panel, means for securing the travel of said block at a desired point, b. manually operable saw tooth locating means, means for locking said locating means in place, c. means for locking said saw blade on said saw holding arbor, wherein said vertical rocker panel is freely balanced on said rocker arm and carries said cutting disc in close proximity to a horizontally disposed saw blade that is freely rotatable on said saw holding arbor.

* * * * *